United States Patent [19]

Long

[11] Patent Number: 5,561,941
[45] Date of Patent: Oct. 8, 1996

[54] SURFACES UPON WHICH INSECTS CAN NOT CLIMB OR ALIGHT AND METHODS AND MEANS FOR THEIR ESTABLISHMENT

[75] Inventor: Roger H. Long, Auburn, Pa.

[73] Assignee: Consep, Inc., Bend, Oreg.

[21] Appl. No.: 137,136

[22] PCT Filed: Apr. 30, 1992

[86] PCT No.: PCT/US92/03648

§ 371 Date: Apr. 7, 1994

§ 102(e) Date: Apr. 7, 1994

[87] PCT Pub. No.: WO92/19101

PCT Pub. Date: Nov. 12, 1992

Related U.S. Application Data

[63] Continuation-in-part of Ser. No. 694,689, May 2, 1991, abandoned.

[51] Int. Cl.$^6$ ........................................................ A01M 1/20
[52] U.S. Cl. ........................ 43/121; 43/132.1; 43/108; 52/101
[58] Field of Search ............................ 43/108, 109, 121, 43/124, 132.1, 107, 58

[56] References Cited

U.S. PATENT DOCUMENTS

| 4,794,724 | 1/1989 | Peters | 43/122 |
| 5,392,559 | 2/1995 | Long | 43/121 |
| 5,414,954 | 5/1995 | Long | 43/121 |

FOREIGN PATENT DOCUMENTS

| 1189700 | 1/1985 | Canada | 43/121 |
| 0160712 | 11/1985 | European Pat. Off. | 43/121 |
| 0428379 | 5/1991 | European Pat. Off. | 43/121 |

*Primary Examiner*—Joseph J. Hail, III
*Assistant Examiner*—James Miner
*Attorney, Agent, or Firm*—Chernoff, Vilhauer, McClung & Stenzel

[57] ABSTRACT

A coating (17) and a method for its preparation are disclosed which will restrict the movement of insects over a skewed surface (15) to which the coating is applied. The coating (17) is an adherent thin film comprised of particles of less than 5 microns. The dispersions are prepared using a surfactant. The surfactant may be removed, at least in part, from the film by leaching or evaporation. The dispersion may also include a dispersing agent which need not be removed from the film. Stabilizing agents may be added to protect the dispersions from freeze/thaw cycles. The coatings (17) are preferably applied by spraying or roller coating the dispersion over the surface (15).

23 Claims, 2 Drawing Sheets

SURFACES UPON WHICH INSECTS CAN NOT CLIMB OR ALIGHT AND METHODS AND MEANS FOR THEIR ESTABLISHMENT

BACKGROUND OF THE INVENTION

1. History of the Application

This application is a continuation-in-part of my U.S. patent application Ser. No. 07/694,689 filed on May 2, 1991 now abandoned.

1. Field of the Invention

This invention relates to methods and means for providing surfaces upon which insects can neither climb nor alight, and more particularly, to non-toxic, non-debilitating methods and means for causing crawling insects to abandon a site they have infested, for discouraging crawling insects from infesting a site where they are not wanted and for preventing an insect from alighting or clinging to an inclined surface.

2. Discussion of the Prior Art

The crawling insects of the type with which this invention is concerned are those which are pests or nuisances to man. These include, for example, gypsy moths that crawl from the ground up into trees to devour the leaves of the trees; cockroaches, spiders, scales and palm aphids which are often offensive in appearance and may carry and spread disease; and, perhaps the most widespread and annoying of the general group, is the ubiquitous ant. The ant exists in many forms including the destructive leaf eater, Argentine, carpenter and pharaoh ants, the termites and, of course, the militant and destructive fire ant. Fire ants may cause havoc, particularly in the warmer climates, by infesting various electrical apparatus such as transformers and switch boxes and, because of their aggressive habits and acidic residues, cause breakdowns of the insulation and destroy the electrical operation of a device. Ants may be attracted to electrical devices because of the magnetic field created by the alternating current and perhaps by the warmth and shelter provided in the interior of an electrical device.

Many pesticides and insecticides are available which will kill or disrupt the life cycle of crawling insects, but essentially all of them are environmentally objectionable because of their toxicity. The toxicity which can endanger animals and humans prevents the use of pesticides and insecticides at times when food is present as in dinning rooms, kitchens, picnic tables, pet food dishes and the like.

Pesticides and insecticides are also less than ideal in function when used in an outdoor environment in which they may be washed away or otherwise rendered ineffective when exposed to the elements.

A number of crawling insect traps are disclosed in the prior patent art which utilize surfaces that have been treated to make it difficult for insects to crawl over the surfaces. Typically, these traps have a vertically disposed surface that the crawling insects must crawl over to get out of the trap. By one method, a sticky substance is spread over the surface which entraps the insect, much like fly paper, or, by an alternative method, a vertical surface is made slippery to the crawling insect so that the insect loses its footing and slides into the tray.

An early attempt to make an insect trap with a slippery vertical surface is disclosed in U.S. Pat. No. 400,460 where there is shown a trap in the form of an open topped box fitted with inwardly and downwardly slanting sidewalls. The upper portions of the slanting sidewalls are covered with a moderately rough material, such as paint, paper or cloth, and immediately subjacent this surface is a polished surface that, it is said, causes the insect, upon leaving the comparatively rough surface, to lose its footing, slide down the polished surface and fall into the bottom of the trap.

Variations of the 400,460 patent in which a slippery vertically disposed surface is used appear in U.S. Pat. No. 1,667,048 in which a slippery glazed surface is used; U.S. Pat. No. 2,167,978 in which the vertically disposed surface is treated with a powder that adheres to and renders ineffective the cupolas and cleaving balls of insect's legs; U.S. Pat. No. 3,851,417 in which a slippery film is made from a mixture of lanolin and linseed oil; and U.S. Pat. No. 4,030,233 in which a slippery surface is provided by soaps or other fatty substances. Representative of the sticky substances method is U.S. Pat. No. 2,606,391 which discloses a hydrophilic, non-drying, high viscosity gel to entrap a crawling insect.

U.S. Pat. No. 4,263,740 is of interest since it discloses an insect trap having inwardly and downwardly sloping side walls that are covered with a loosely adhering particulate material in a preferred size range of from 100 to 300 microns. The particulate material is loosely held so its "equilibrium" will be "upset" and break loose when an insect attempts to cling to it. In operation, the insect first crawls across the coating and its pulvilla are coated with particulate material, destroying their ability to adhere to a slippery surface. When the insect reverses its direction in an attempt to crawl up the slanting sidewall and escape from the trap, the insect attempts to grip the particulate material with its tarsal claws since it pulvilla are no longer "sticky". This causes an "avalanche" of the loosely held particles that fall with the insect into the trap. The particulate material may be organic or inorganic and as examples Teflon(R), sand, clay, ground pyrophyllite, aluminum silicate, cellulosics, talc, sand, and flour are given. The coatings proposed by this patent lack permanency since they are necessarily destroyed when one or more "avalanche" occurs.

Entomologists have used similar techniques as discussed above to contain experimental insects within laboratory vessels. They have, for example, coated the inside walls of vessels with sticky substances, most commonly Vaseline(R) and mineral oil, to prevent insects from escaping. This method suffers from the fact that the insects become entrapped and die. Similarly, the insects are smothered when they attempt to climb surfaces which have been coated with talc, which is another method sometimes used by entomologists. To avoid killing their specimens, entomologists have also used the slippery surface technique by coating the interior side walls of vessels in which they keep their experimental insects with water dispersions of polytetrafluoroethylene. After one or more coatings are painted in a wide band on the side walls, many crawling insects are unable to climb the walls and are contained within the vessel. These coatings are of limited utility. They are fragile, they do not adhere well and they must be carefully handled, preferably in the controlled environment of a laboratory where they can be protected from accidental damage. Once a portion of the coating cracks or sloughs off, gripping points are provided to let the insect advance up the side walls of the vessel. These coatings are also adversely effected by water and insects can readily climb over surfaces after they become wet.

Because of these shortcomings, the slippery coatings or loosely adhered coatings which have been used by entomologists must be protected from physical abuse, they must be kept dry, they must be renewed frequently, previous coatings must be completely removed before a surface can be recoated, and the coatings are applied in wide bands, relative to the length of the insects, to make up for imperfections in the coatings.

The present invention is related to the above described prior art in that it relies upon coated surfaces to restrict the movement of crawling insects. Unlike the prior art devices, however, the surfaces of this invention are more durable, they do not require frequent renewal, they do not injure the insect, they can be applied in relatively narrow bands, they are not moisture sensitive, they can be used to control the movement of different sized insects selectively and, rather than confining the insects within a given trap or perimeter, they can either prevent the crawling insects from entering a given area or cause the crawling insects to abandon an area they are inhabiting. The invention may, unlike any other prior art known to the inventor, also provide for the establishment of skewed surfaces, such as walls and ceilings, upon which insects, including flying and hopping insects, cannot alight or come to rest.

By way of definition, the term "skewed surface" is used in this specification and the appended claims to describe a surface that presents an angle of about 20 degrees or more to the horizontal and is meant to include surfaces upon which insects must alight upside down.

SUMMARY OF THE INVENTION

Accordingly, it is an object of this invention to prevent crawling insects from infesting certain areas.

A related object of this invention is to cause crawling insects to abandon an area which they have previously infested.

Another object of this invention is to protect areas from infestation from crawling insects without using insecticides or toxic substances that may be harmful to the environment.

Another object of this invention is selectively to control the type or size of crawling insects which enter or leave an area.

Another object of this invention is to prevent flying or hopping insects from alighting on or clinging to surfaces such as walls or ceilings.

Another object of this invention is to provide for the creation of an environment which is not hospitable to crawling insects and will cause them to leave and establish their nests elsewhere.

Another object of this invention is to provide wearing apparel such as shoes and boots, ankle protectors, outer garments and the like which will prevent crawling insects from climbing onto the human body.

Another object of this invention is to prevent insects from crawling up the legs of furniture.

Another object of this invention is to provide methods and means for controlling the movement of crawling insects which are simple to use, are effective in relatively small amounts, remain effective over prolonged periods of time, are capable of withstanding moderate abuse, and remain effective when wet.

Another object of this invention is the provision of methods and means to control the movement of crawling insects that are capable of use in an exposed, outdoor environment.

Another object of this invention is to preserve the operational effectiveness of electrical devices by preventing them from being overrun with crawling insects.

Another object of this invention is to provide a liquid and a method of spraying it onto a surface in order to form an adherent film that is uniform in thickness and which resists cracking or cratering.

Another object of this invention is to provide a coated flexible tape which may be adhered to skewed surfaces to inhibit the movement of crawling insects.

These and other objects of this invention are achieved by preparing a liquid dispersion of finely divided particles having an average particle size of less than about 5 microns, and preferably less than about 1 micron, and more preferably still, less than about 0.5 microns; applying the dispersion in the form of a smooth, continuous, coating of the dispersion, free from discontinuities and bubbles over a surface; and drying the dispersion to form a coherent film which cannot readily be washed or wiped away.

In the practice of this invention it has been found that crawling insects, such as ants, termites, gypsy moths, cock roaches and the like cannot climb on the coated surfaces when the surfaces are set at an angle to the horizontal. The minimum angle required to impede the progress of an insect over a surface coated in accordance with this invention will vary with the characteristics of the insect such as its size, whether it has any sticky substances on its legs, whether its tarsi have claws, and in the case of crawling pests such as caterpillars, how many legs it has. Nonetheless, as a generality, it may reasonably be estimated that surfaces treated in accordance with this invention should be skewed at least about 20 degrees to a horizontal axis to be effective. In the case of flying insects such as flies, gnats, or mosquitoes, and hopping insects, such as fleas, surfaces treated in accordance with this invention will prevent these pests from alighting or resting on steeply slanting surfaces, such as walls, or upside down as on ceilings.

By way of example, if it is desired to prevent gypsy moths from climbing a tree, the trunk of the tree can be coated with a circumferential band of the film forming substance of this invention. It has been found that when a surface to be treated is either too rough or porous, like the bark of a tree or the surfaces of wood, bricks, cinder blocks or the like, it is difficult to coat the bark or other rough or porous surfaces) in a manner that is effective to prevent insects from climbing the tree. This problem can be overcome by several means such as by painting the bark of a tree at the area to be treated with a sealant to provide a better surface to which the film forming material of this invention will adhere. By another means, the film-forming material is coated on the surface of a flexible base material which is then tightly wrapped around and adhered to the bark. And by yet another method a flexible thin strip of material is pressed against the bark of the tree and the thin strip is then sprayed or otherwise coated with the film forming dispersion. Metal foils, such as aluminum foil, which can readily be conformed to an irregular surface, are particularly convenient materials to use as the metal strip. Flexible webs such as cloth backed duct tape can also be used. It is intended that all of the above techniques are included within the scope of this invention.

It has been observed that the surface characteristics of the film forming materials of this invention may change when the film becomes wet with water. When a surface which has been prepared in accordance with this invention is exposed to the outdoor elements like snow, rain or high humidity, it may rewet and lose its effectiveness in preventing insects from crawling on its surface. It is believed that the tendency of the film to rewet is a function of the surfactant used in preparing the dispersion and it has been established that the problem can be overcome either by utilizing a surfactant that does not rewet, or by removing the surfactant after the film has been formed. In this latter instance, it noted that some surfactants are naturally destroyed by exposure to an outdoor environment and UV light and other surfactants can be leached out of a film by washing the film with a solvent which, depending upon the surfactant, may include water, alcohols, acids, bases and the like.

The proper selection of the surfactant is initially of concern to obtain a uniform dispersion of the fine particles. The selection of the surfactant is important because it will influence the properties of the dry film including the strength of the film, the adhesion of the film to a surface, the ease with which the film can be rewet, and the surface characteristics of the film such as tack, oiliness and the like. Further, when the dispersion is applied to a surface by use of an aerosol spray, a propellent must be selected that is compatible with a given surfactant and will not result in the destruction of the dispersion.

Surfactants are generally used to maintain finely divided particles in a dispersed form. When the surfactants are not used, many kinds of fine particles will agglomerate or cling together and make the dispersion unstable. To avoid this and so extend the shelf life of the dispersion, it is sometimes desirable to coat the particles in the dispersion with polymeric materials that will attach to the surfaces of the dispersed particles and prevent them from agglomerating. By these means, a stable dispersion with a long shelf life may be formulated without the use of conventional surfactants.

In the preferred practice of this invention, aqueous dispersions are stabilized from the harmful effects of freeze/thaw cycles to permit their transportation and storage in the colder winter months. Stabilizers which are suitable for use in the dispersions of this invention include monohydric alcohols having less than five carbon atoms that can form clathrates with water; polyhydric compounds: and the amine analogs of the alcohols and polyhydric compounds. These stabilizers are disclosed in a United States patent application filed of even date in the name of Thomas H. Eberlein entitled "Aqueous Dispersions Stabilized from Freeze/Thaw Cycles" which is incorporated herein by reference.

The solids which are used to form the dispersions of this invention must average less then 5 microns as measured along their principle axis, preferably less than 1 micron and more preferably still less than 0.5 microns. The small size of the particles is important not only to make it difficult for an insect to gain a purchase on a surface which is coated with a dispersion made up of the particles, but it also is important to provide a coating which is essentially a continuous film. (Here and elsewhere in the specification and claims, the dried residue that results when a dispersion of this invention is applied to a surface and dried is referred to as a "film" since it appears to the naked eye to be continuous and since it is known that it will be effective in controlling the movement of insects only if it is free from discontinuities that can present a gripping point to an insect. On the other hand, this "film" may have little or no tear strength and, unless applied to an adhesive substance as is discussed below, the dried coating cannot be peeled away from a surface without destroying the "film". For this reason, and since a better term does not suggest itself, it should be understood that the term "film" as used herein may not be entirely consistent with some definitions of the term.)

It is believed important that the small particles selected for use with this invention be free from surface tack in the sense that they should not help an insect gain a hold. So too, the film should be free from oil or other sticky substances.

The above criteria greatly limit the materials that are available for use in this invention. Since there are few, if any, naturally occurring materials in the desired sub micron size range, and since it difficult to grind most solids to a sub micron size range, it has been found convenient to use synthetic plastics that are prepared directly in sub micron particle sizes by dispersion or emulsion polymerization. Of particular usefulness are the fluorinated hydrocarbons which are prepared by dispersion polymerization including polytetrafluoroethylene (PTFE), fluorinated ethylene-propylene (FEP) and perfluoroalkoxy (PFA). Dispersion grades of the fluorinated hydrocarbons are commercially available in particle sizes ranging from about 0.1 to about 0.5 microns, which are ideally suited for use in this invention.

Other materials which have proven effective in the practice of this invention include synthetic polymers including dispersion grade acrylics, precipitated nylons and inorganic materials including powdered aluminum silicate, talc, carbon black, and pigments such as titanium dioxide.

A particularly preferred material for use in this invention is a dispersion grade polytetrafluoroethylene that is available in a size range of from approximately 0.2 to 0.5 microns. This material is rather soft and when compressed, as by squeezing between the fingers, the finely divided particles smear together and lose their discrete entities. When this occurs, the effectiveness of the coating is markedly diminished. It has been found that by combining hard, rigid particles in the desired size range, such as titanium dioxide with the soft polytetrafluoroethylene particles, a more durable coating is obtained which retains the discrete form of the polytetrafluoroethylene particles even when the coating is subjected to compressive forces and other handling abuses.

As will be discussed in greater detail in the Examples that follow, there is a correlation between the particle size of the materials comprising the film and the size of the insect that can traverse its surface. As a general rule, the smaller the insect the smaller must be the size of the particles. As an example, if a mixture of 0.2 micron PTFE and 5 micron aluminum silicate particles are used to form a film, ants can crawl up the film whereas cockroaches cannot. If, on the other hand, the film is made entirely from 0.2 micron particles of PTFE, neither ants nor cockroaches can climb the film.

It has also been observed that certain crawling insects, particularly ants, seem compelled, for whatever reason, to crawl up onto the top surface of the mounds they build. If a number of stones, or relatively smooth, small rounded particles of most any material are coated with a film in accordance with this invention and piled on the top of an ant mound, the ants desert the mound and move their colony elsewhere. The same effect can be achieved if ceratin coated mechanical structures with skewed surfaces, such as of an egg crate design, are placed on the top of an ant hill. (For convenience, the stones, round particles and mechanical structures with skewed surfaces coated in accordance with this invention for placement on the top of present or prospective ant hills are sometimes hereinafter collectively referred to as "stones"). While the phenomena is not understood, it is presumed that the ants become frustrated when they are unable to climb and carry small particles over the stones to increase the height of their mound.

The above discovery can be utilized to considerable benefit where it is important to exclude ants from a location because of the mounds they build. Thus in the case of a ground level pad which supports an elevated transformer, a coating can be applied to the vertical cables or conduits leading from the ground upwardly to the transformer to prevent ants from climbing up the cables or conduits into the transformer. However, since the ants can still nest in the housing at ground level and erect mounds that potentially may obstruct auxiliary devices, a layer or two of round particles, such as small stones, can be coated with the dispersions of this invention and distributed over the base of the pad. In this manner the ants can neither climb the cables nor build mounds within the housing.

Another example of the benefit that can be gained by placing stones with treated surfaces on the top of ant hills can be found in water meters that are located in housings at or slightly below ground level. These housings are often infested with ants which build large mounds that cover the face of the water meter and prevent readings from being taken. The ants can be caused to leave the housing (or not enter it in the first instance) if smooth shaped objects, such as stones, are treated with the dispersions of this invention and placed within the housing in surrounding relationship to the water meter. Apparently, since the ants can't climb up onto the surface of the coated objects carrying dirt with them to build a mound, they become frustrated and leave the site.

DETAILED DESCRIPTION OF THE DRAWINGS

Figure 1:
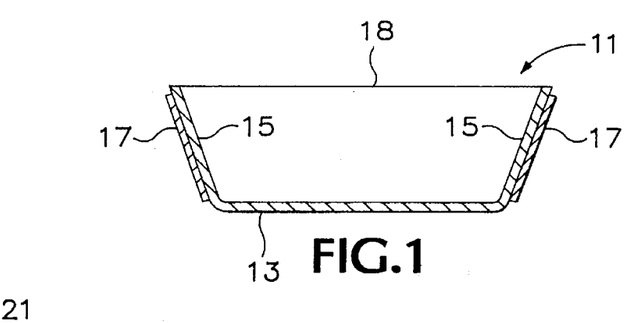
FIG. 1 is a sectional view of a pet dish adapted for use in the practice of this invention.

FIG. 1 illustrates this invention as used to protect a pet food dish 11 from an incursion of crawling insects and, in particular, ants. The pet dish 11 is comprised of a base 13 and a side wall 15. A portion of the side wall 15 is shown coated with a film 17 formed in accordance with this invention extending around the entire periphery of the pet dish 11. This film will prevent ants and other crawling insects from climbing up the sidewall 15 and into the dish 11.

In a similar manner as illustrated in FIG. 1, a film comprised of the finely divided particles of this invention may be applied to the side surfaces of many different objects and prevent insects from crawling up these surfaces. While not shown in the drawings, it can be understood that the invention as illustrated in FIG. 1 can be used on such objects as the legs of lawn chairs and tables, the outside of buckets or other containers, around the handles of garden tools, on the pedestals of outdoor grills, on the wheels of baby buggies, and so on almost without limit.

The invention also finds utility in preventing insects from crawling on animals and humans. One aspect of the invention lies in applying films to articles of wearing apparel including boots and shoes, ankle protectors, outer garments such as overalls, decontamination gear and such like. The films of this invention also may be applied to mats, platforms, outdoor furniture and other articles that are designed to rest on or be supported by the ground.

Figure 2:
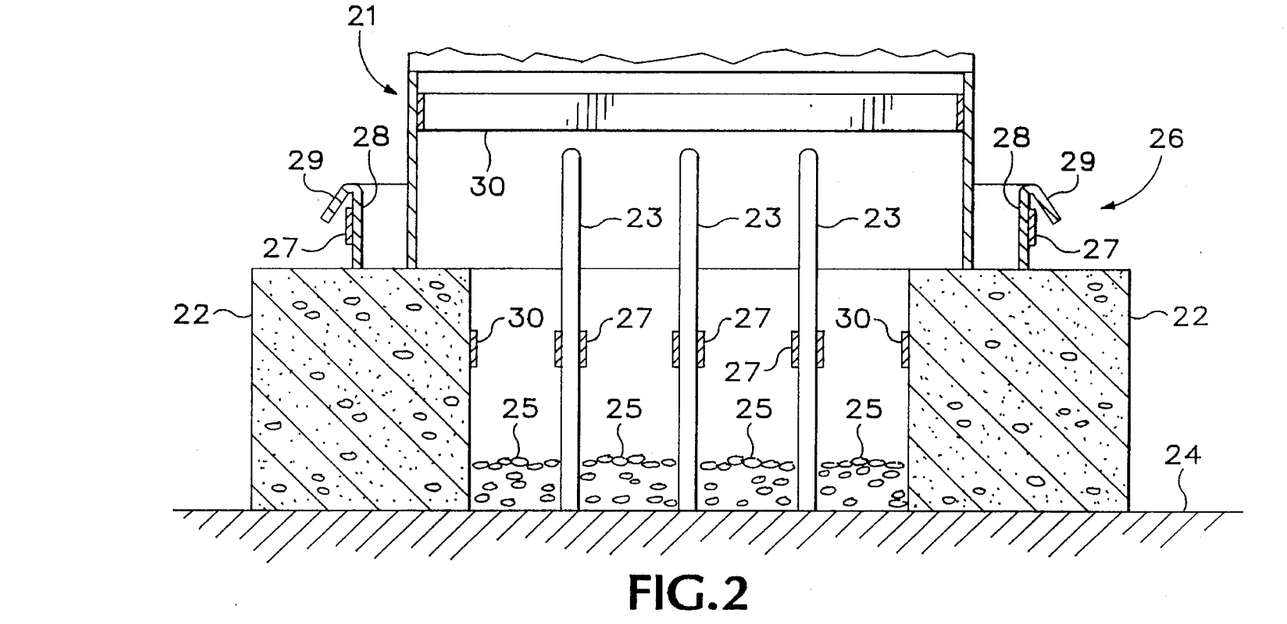
FIG. 2 is a cut away and somewhat schematic view of the lower portion of an electrical device mounted on a ground level pad.

In FIG. 2 there is shown a schematic cutaway view of the lower side wall 21 of an electrical device, such as a switch box, transformer, junction box or the like, mounted on a cement pad 22 which in turn rests on the ground 24. Cables 23 pass upwardly through the ground 24 into the interior of the device. Shown mounted on the cement pad 22 is a protective sleeve 26 that surrounds an exterior portion of side wall 21 of the electrical device. The protective sleeve 26 is comprised of an upstanding wall 28 and an outwardly and downwardly directed protective flange 29 mounted on the top edge of the wall 28.

A coating 27 is illustrated as having been applied as a circumferential band to the cables 23 and to an upper portion of the wall 28. Note that the coating 27 on the wall 28 of the sleeve 26 is protected from exposure to the elements by the down turned flange 29.

While the sleeve 26 is here illustrated for use with an electrical device, it has general applicability wherever it is desired to protect the coating from the outdoor environment or to protect it from mechanical damage as by scratching, bumping or other mishandling.

A protective sleeve such as illustrated in the drawings may also provide a mechanism by which the film of this invention can be applied to an object. It is within the scope of this invention to coat continuous lengths of a tape or foil with the dispersions of this invention and then unwind the tape or foil, wrap the tape or foil around and adhere it, as by a preapplied pressure sensitive adhesive, to any surface that is to be made resistant to the movement of crawling insects. This is a convenient way in which a protective coating may be adhered to the trunk of a tree, to a cement or wooden surface, to the legs of a wooden picnic table and so on and so on.

In FIG. 2 the side walls of the cement pad 22 as well as the lower side walls 21 of the electrical housing are illustrated as being coated with a band 30 of a protective film applied from a dispersion of this invention. Since the cement pad 22 is porous, a sealant should first be applied to its surface before the band 30 is coated on the surface or, in the alternative, a coated pressure sensitive tape as discussed above can be used.

The cables 23 are surrounded at ground level 24 with a layer of stones 25 which have been coated with a film prepared in accordance with this invention. The stones 25 fill the entire spaces between the cables 23 and the wall 28 so that insects can not build their mounds within the confines of the cement pad 22. Further, to the extent that any ants succeed in entering the electrical device 21, they will be unable to climb the cables 23 past the protective coating band 27.

Many different types of electrical devices are natural targets for infestation by ants. These include ground landing lights at airports, television and telephone junction boxes, patio lights, traffic signal controllers, transformers of all sorts including both ground level and pole mounted, etc. When ants overrun and take up residence in these devices, it is not uncommon to find that the device malfunctions or is rendered inoperative. Ants can be discouraged from infesting devices of this kind by taking care to apply an insect controlling film barrier to the inside and outside walls of the electrical devices, to the wires within the devices that rise vertically from the ground and to stones which should be scattered over the bottom surface of the electrical devices.

Figure 3:
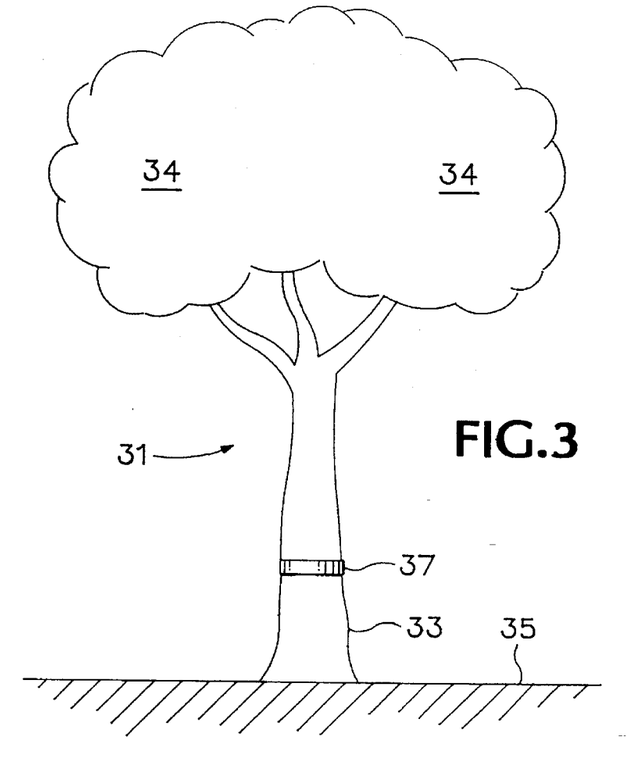
FIG. 3 is a schematic illustration of the trunk of a tree having a protective band applied in accordance with this invention.

FIG. 3 is a schematic illustration of a tree 31 with its trunk 33 rising above the ground 35. To prevent crawling insects, gypsy moths for example, from climbing up the trunk 33 and infesting and eating the leaves 34 of the tree 31, a protective band 37 is shown adhered to the circumference of the trunk 33. The protective band 37 may be a strip of metal foil or tape which is coated with a protective film on one side and an adhesive on the other side. The tape may be securely pressed against and adhered to the trunk 33 of the tree 31 thus providing a barrier to prevent crawling insects from climbing the tree.

Figure 4:
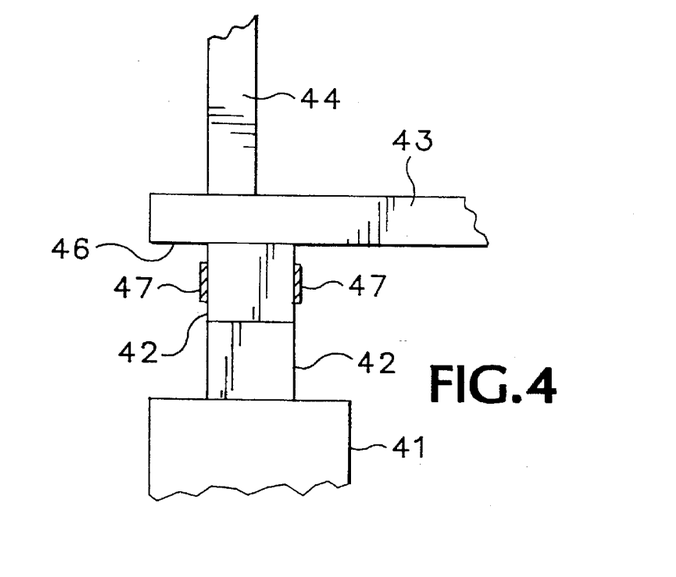
FIG. 4 is a sectional view of a small portion of a building showing the foundation and first floor at ground level.

FIG. 4 is an illustration of the invention as used to protect a building from infestations by crawling insects, particularly ants and termites. Here there is rather schematically illustrated a small portion of a building at ground level. A concrete support pier 41 supports two courses of concrete blocks 42. Mounted on the concrete blocks 42 is a concrete pad 43 that serves as the ground floor of the building. As illustrated in the drawing, the pad 43 has an overhang 46 that extends slightly outboard and beyond the concrete blocks 42. An outside wall 44 is mounted on the slab 43 and extends therefrom in an upwardly direction.

To protect the building from the entry of crawling insects, a film 47 has been affixed to the exposed sides of the concrete block 42. As discussed in connection with the film 37 attached to the tree 33 in FIG. 3, the film 47 may be sprayed directly onto the block 42; it may be sprayed onto a base coat previously applied to the block 42; it may be applied to a tape previously adhered to the block 42; or the film 37 may be pro-coated onto the surface of a tape which is subsequently affixed to the block 42.

As illustrated in FIG. 4, the film 47 is protected from abrasion, the weather, rain and UV light on one side of the block 42 because of the overhang 46 and on the other side of the block because it is entirely protected within the building structure. While not necessary to do so, protective device such as the sleeve 26 illustrated in FIG. 2 may be used to protect the film 47 from direct exposure to the elements.

In the above illustrations of the utility of this invention, vertical surfaces were coated with a film to prevent the movement of crawling insects. The width of the applied film is important since it must be wider than the length of the insect. Otherwise the insect can extend its body length over the width of the film and continue on its way. In the special case of ants which are able to build a pyramid with their bodies when the occasion demands, the width of the protective film must be considerably wider than the length of the body of an ant to prevent the ants from making a bridge around or over the film. For this reason, the width of the film should exceed the length of the insect by several fold, depending, of course, on the agility and cooperative abilities of the insects.

Similarly, if protection from hopping insects such as fleas is desired, it is obvious that the width of the protective film must exceed the distance that the insect can hop or jump.

Considerable study has been given to the size and shape of the particles that work best in the practice of this invention. Previously it has been noted that the most preferred size of the particles, when measured along their principle axis, should be less than about one micron and, even better still, in a size range of from about 0.1 to 0.5 microns.

Originally it was believed that particle shapes approaching the shape of spheres would outperform more irregular particles in their effectiveness in this invention. However, the examination of numerous photo-micrographs that were taken of films made from particles of various shapes, suggests that if the particles are in the desired size range, it makes little observable difference in their performance whether they are spherical, cubic, rectilinear or cylindrical. Particles of any or a combination of these shapes appear to work with substantially equal effectiveness in preventing insects from crawling up surfaces coated with them. So too, the photo-micrographs indicate that the arrangement of particles in the film, whether they all be of the same size and shape to allow an alignment into a closely packed ordered array, or whether they are disordered mix of different sizes and shapes make little difference in their effectiveness.

EXAMPLES

In the Examples that follow, the dispersions were prepared by adding the ingredients together and mixing them well by mechanical agitation. A Waring type blender is well suited to this purpose although other mechanical mixing devices can be used. In the Examples, the quantities are given by weight unless otherwise noted.

Example I 100 grams of aluminum silicate were dispersed in 200 grams of water and 4 grams of a surfactant. The aluminum silicate had a particle size of about 5 microns and was obtained from R. T. Vanderbuilt. The surfactant is sold under the trade name Darvan(R) #2 by the R. T. Vanderbuilt Company and is described as being a sodium salt of benzoid alkylsulphonic acid.

The above dispersion was sprayed onto a glass plate in a 5 centimeter band using a pump type sprayer. After the water evaporated, a coherent film was left on the glass plate where it had been sprayed.

The glass plate was placed in the proximity of ants and it was found they could climb up and over the film when the glass plate was held in a vertical position. On the other hand, when the glass plate was exposed to roaches and caterpillars, it was found that these larger insects were restrained and could not climb up the film. It is believed that the size of the particles that comprise the film is related to the size of the insets that can or can't climb on the film. Presumably small insets like ants can get a foothold on 5 micron glass particles whereas larger insets such as roaches cannot. As will be demonstrated below, neither of these insects can climb on the surface of the film if it is made from particles that are less than about 0.5 microns.

Example II

The same experiment was repeated with a finely divided nylon made by a precipitation process and sold under the tradename Nylasint (R) by The Polymer Corporation being substituted for the aluminum silicate. Again it was found that when a narrow band of the dispersion was sprayed onto a glass plate, ants could climb up the deposited film, but larger insects such as roaches and caterpillars could not.

Examples I and II are of interest because they demonstrate the utility of this invention in selectively controlling the movement of different kinds of insects. An illustrative example of when it may be advantageous to exclude one insect while permitting the passage of another is the protection of trees from caterpillars that climb up the trunks of the trees and gorge themselves on the leaves. By using coatings such as disclosed in these first two Examples, the caterpillars can be prevented from climbing trees while, on the other hand, ants will be able to climb the trees to protect the trees from other insects such as seed feeding beetles.

Example III

The experiment of Example I was again repeated, but this time titanium dioxide was used in place of the aluminum silicate. The titanium dioxide was obtained from the DuPont Company and it is described as being of an average particle size of about 2 microns. As in Examples I and II, a coating of this material was effective in restraining the movement of roaches but did not impede the movement of ants.

Example IV

As a general rule, the more effective the surfactant is to promote adhesion, the greater is its capability to rewet when exposed to water. Since it has been discovered that insects can crawl up surfaces coated in accordance with this invention if the surfaces are wet, it is obvious that it is preferred, particularly for outdoor applications, that the surfaces do not rewet in the presence of water. On the other hand, if all of the surfactant is removed from the applied film, a substantial loss of adhesion occurs. It accordingly becomes necessary in the practice of this invention to balance the adhesion of the film against the tendency of the film to rewet to accommodate particular uses. As a generality, it is thought better to use surfactants that promote good adhesion and wash them away after the film is formed than it is to use surfactants that poorly promote adhesion and let them remain on the dried film.

In this Example PTFE dispersions were prepared using several different surfactants and films were formed by spraying the dispersions on a glass plate and allowing them to dry. It was found that, as discussed above with regard to reweting of a film, a balance must be achieved between good and bad adhesion. On the one hand, good adhesion is a desirable property since it yields a film that is more durable, that will weather better and that will last longer. On the other hand if the film is too tightly adhered to its substrate, it has been found that it will be ineffective in preventing the movement of insects up its surface.

Taking the extreme case in which a film is fully fused over and bonded to a substrate, the film will not control the movement of insects no matter how smooth or slippery the film is. This can be demonstrated with a kitchen utensil which has been coated with PTFE to form a non-stick surface. It can be shown that insects have little difficulty in climbing up this type of surface.

At the other extreme, if a surface is merely dusted with a fine powder, such as talc which has little or no adhesive affinity for the surface, it may be effective to prevent insects from climbing on the surface, but is of little practical value since it can easily be disrupted and has no permanency. It is therefore important, in the practice of this invention, to select a surfactant that will provide sufficient adhesion to prevent the movent of insects over a selected surface while, at the same time, will provide sufficient adhesion to preserve the integrity of the film under the conditions of intended use. This is in contrast to the coatings which are taught in U.S. Pat. No. 4,263,740 previously referred which applies particulate materials to a surface with such little adhesion that, when traversed by an insect, will give way and create an "avalanche" of the particulate material.

As a general rule it may be said that coatings which are desirable in the practice of this invention should adhere with enough persistence as to maintain adhesion when the coating is wiped as with a rag, is washed in a household dishwasher or is placed under running tap water. On the other hand, the adhesion should be weak enough to permit a layer of the coating to be removed when a cellulose type adhesive tape is applied to and removed from the coated surface.

With the foregoing in mind a finely divided PTFE having an average particle size of about 0.2 microns was dispersed using several different surfactants to form a dispersion having about 30% solids content. The dispersion was sprayed unto a glass plate and, after it had dried, the adhesion to the glass plate was noted.

The least effective of the surfactants tested for promoting adhesion was Darvan(R) #2. The adhesion of the film was materially improved when Triton(R) X-100 as sold by Union Carbide (described as octylphenoxypolyethoxyethanol) was used and even better adhesion was obtained when a mixture of Triton(R) X-100 and Zonyl(R) FSN from DuPont (described as perfluoroalkylethoxylate) was used.

Example V

It is important that the films of this invention be smooth and continuous, free from discontinuities, bubbles, blisters, mud cracks and the like, if they are to be effective in preventing the movement of insects. This experiment demonstrates the importance of applying a film in a manner in which the desired smooth end continuous coating can be obtained.

A dispersion was prepared using 60% of a minus 0.5 micron PTFE dispersed in about 33% water using about 7% Zonyl(R) FSN (Du Pont) as a surfactant. This dispersion was first applied to a glass surface by spraying, as in Example I, and next it was applied to a glass surface with a small paint brush. After the surfaces had dried, it was observed that the coating that was brushed on was not nearly as smooth as was the coating that was sprayed on. In addition to surface irregularities, small bubbles and other discontinuities were seen in the brushed on coating. In contrast, the sprayed on coating appeared to be much smoother and had no visible bubbles or discontinuities.

When the coatings were placed in the vicinity of an ant colony, the ants were unable to climb up the sprayed coating but, with same difficulty, were able to climb the coating that was applied with a brush. Presumably the ants were aisle to obtain a grip on the painted surfaces where bubbles and other irregularities were present.

Example VI

A number of tests were performed to observe the effect of changing the solids content of the dispersions. As a generality it was observed that a higher solids concentration was required when the dispersions were sprayed on rough or irregular surfaces as compared when sprayed on smoother surfaces. Thus when a pile of stones was placed over an ant hill, it was found that the effectiveness in causing the ants to abandon their hill was improved when the solids concentration of the finely divided PTFE was at about 60%. As a practical matter this is about as high as one can go in solids loading using commercially available dispersions.

By comparison, when a smooth glass plate was sprayed to form a coating, a film effective to prevent the movement of ants (but not roaches) was sprayed on from a dispersion in which the solids content of the dispersion was only about 15%.

From the foregoing it was concluded that a 60% solids dispersion is effective against all insects even on irregular surfaces but that a 15% solids dispersion is more limited in application and can only be used on smoother surfaces to control smaller insects. However, for cost effective purposes, it is preferred to keep the solids concentration as low as possible for any given application. In the case of formulations prepared for spraying, the solids concentration should be kept below about 30% to avoid clogging a spray nozzle.

Example VII

As has been discussed above, the width of the film relative to the length of the insect is of some importance. It is rather obvious that the film must be wide enough to prevent the insect from reaching or stretching over the film and thus the width must exceed the body length of the insect. Some allowance must be made for the agility and persistence of an insect but it has been found in working with roaches and caterpillars, that if the applied film is about twice the length of the insects body, it is a fairly safe assumption that the insect will not be able to climb over the width of the film.

A notable exception to this generality exists in the case of ants. As mentioned above the social ability of ants to work together enables them to build pyramids with their bodies in order to make a "ladder" and climb higher. This must be taken into account if the film is applied at ground level or at any other location where the ants can make a pyramid out of their bodies to bridge over the width of the film.

Example VIII

In Example V, comparisons were made between films applied by spraying and those that were applied by a brush. It was demonstrated that the smoothness and integrity of the applied film is of great importance in preventing insects from getting a purchase on a discontinuity in the film. In a similar manner, it is important that the applied film does not form "mud" cracks or develop fissures as it dries.

It has been determined that the tendency of a film to form mud cracks is a function of the thickness of the film, the size of the particles that make up the film and the number of layers of a dispersion that are applied to constitute the film. As a generality it may be said that single coating layers of a dispersion are less subject to mud cracking than are multiple coats and are therefore to be preferred.

A comparison was made between a general purpose PTFE dispersion sold by DuPont under its trade designation Teflon(R) 30 that is a mixture of particles less than about 0.5 microns and averaging about 0.2 microns, and a PTFE dispersion sold by DuPont under its trade designation Teflon(R) TE-3170 that is comprised of particles mostly of a size of about 0.18 microns.

It was found that when the T-30 PTFE dispersion was used to cast a film, a dry film of about 1 mil could be applied to a surface without cracking occurring. On the other hand when the TE-3170 was used, it was necessary to limit the dry film thickness to about 0.5 mil to prevent cracking. It is believed that this difference is due to the way the smaller particles pack together when the wet film dries.

The above demonstrates the importance of applying thin films, e.g. 1 mil or less, with commonly available dispersion grades of PTFE in order to obtain a crack free surface. As a practical matter this limits the methods by which the dispersions can be applied to a surface since a uniform film of the desired thickness cannot be applied with a brush and must be applied methods such as by spraying the dispersion onto a substrate, dipping the substrate into the dispersion, or by roller coating.

Example IX

In preparing the films of Example VIII, not only was the effect of the particle size relative to the thickness of the non-cracking coating noted but it was also discovered that when the solids concentration of the Teflon(R) 30 was reduced from about 60% as purchased to about 30%, the applied film was not only thinner, as was to be expected, but also the film appeared to be more tightly adhered to the glass plate, it was very smooth and it was free from mud cracking. One of the significant aspects of this is that the more dilute Teflon(R) 30 can be over coated with a second coating without cracking. This is not true of the finer TE-3170 which cracks excessively if two coats of the dispersion are applied to a glass plate. As it is to be expected that many persons who attempt to practice this invention by spraying a dispersion onto a surface will spray over a previously coated surface to be certain that no area is left exposed, a more forgiving dispersion that will allow for multiple coats without cracking can be formulated with the larger particles of the Teflon(R) 30 using a solids concentration of about 30%.

Another useful method of preventing mud cracking and avoiding uneven surfaces, such as those having orange peel effects, is to include additives that will enhance the continuity and smoothness of the film. These additives are well known in the coating art and are generally referred to as flow promoters, anti-cratering agents, anti-cracking agents and such like. One such composition which may usefully be included within the dispersion to promote flow-out of the coating is methylamyl ketone.

Example X

A stable dispersion useful for spraying was prepared by diluting a polymerization dispersion of PTFE having 60% solids to 30% solids by the addition of water. The dilution has the advantage of making the dispersion more readily sprayable in the sense that the dilute dispersion is not as apt to clog a spray nozzle. Also, as mentioned above, the more dilute dispersion when applied to a surface has a reduced tendency to mud crack and over-sprays are more readily accommodated.

When the above dispersion was sprayed onto an aluminum foil substrate and dried, it was found that the resulting coating was tightly adhered to the foil and it resisted cracking even when the foil was bent and crumbled. When the foil was placed on the top of an active ant mound, it was observed that the ants which tried, were unable to climb up the foil. This coating did not adhere well to the aluminum foil and, in particular, it was washed away when placed under running tap water.

Example XI

The above dispersion of 30% solids in Example X was modified by the addition of 4% by weight (total composition) of an adhesion promoter. The adhesion promoter used was an acrylic binder (about 40% by weight) in a water borne dispersion (about 80% by weight).

It was found that the adhesion of the coating to aluminum foil was materially improved as compared to those of Example X and the tendency to mud crack was substantially reduced.

Example XII

It has been mentioned above that the presence of many surfactants used to prepare dispersions for use in this invention cause an applied film to rewet if contacted with moisture. If the film becomes wet, insects will have little difficulty in climbing on its surface. Most surfactants can be removed, however, as by leaching with a solvent liquid, by evaporating them from a film at elevated temperatures (e.g. 200+ degrees Celsius) or as by exposure to outdoor weathering.

The Triton (R) X-100 (Union Carbide) surfactant disclosed above is one of those surfactants that will rewet in the presence of moisture. It has been found that if certain dispersing agents are substituted for most of the Triton, the resulting film made from such a dispersion will not rewet. Of Particular effectiveness are dispersing agents sold by Rohm & Haas under its trade designations Tamol(R)-165 and Acrysol(R)I-62. The former of these compounds is described by Rohm & Haas as an ammonium salt of an acrylic copolymer.

Based on the foregoing, a sprayable dispersion was prepared that did not rewet after a film was formed. An aqueous polytetraflouroethylene dispersion of about 0.2 micron particle size was diluted to 30% by weight solids. To this was added 3% by total weight of the dispersion of Tamol 165 dispersing agent, 1.2% by total weight of the dispersion of ethanol as a freeze/thaw stabilizing agent, and 2% by total weight of the dispersion of Rohm & Haas adhesion promoting HG-54D (described as a styrene modified acrylic copolymer of acrylonitrile having a Tg of 38–40 degrees Celsius).

An aerosol container was filled with the mixture so formulated and was charged with a halocarbon propellant sold under the trade designation Dymel (R) 152A by Du Pont under a pressure of 65 pounds per square inch.

When a surface was sprayed with the aerosol, it dried to a uniform thin coating which did not rewet when placed under running water and was effective to keep ants from climbing on the surface when it was skewed.

Example XIII

A dispersion was formulated especially for coating aluminum foil in a continuous roller coating operation. So that the rollers can pick up enough of the dispersion to yield a dry continuous film in a preferred range of from about 0.25 to 1 mil, it may be necessary to adjust the viscosity of the dispersion. When a dispersion was formulated by mixing 300 grams of a 60% by weight of an aqueous dispersion of PTFE (DuPont Teflon(R)30-B) with 21 grams of a water dispersion of 41–42% of an acrylic polymer adhesion promoter (HG 54D-Rohm & Haas) the viscosity of the mixture was 18 seconds as measured using a #2 Zahn cup. This was too watery to obtain good pick-up on the rollers and the formulation was adjusted by the addition of 50 grams of ethylene glycol monobutyl ether to raise the viscosity to 30–35 seconds as measured with the #2 Zahn cup.

The above formulated dispersion was used to roller coat on aluminum foil. The wet coating was placed in an oven heated to about 150 degrees C. for a period of about one minute. This short time in the oven was sufficient to dry the coating and drive off the surfactant that was used in making the Teflon 30-B, but the oven was neither hot enough nor the time long enough to fuse the particles of PTFE. The dried coating was approximately 0.5 to 1 mil in thickness.

The coating produced was tightly adherent to the foil and resisted cracking when the foil was deformed. Fire ants were unable to climb on the coated surface of the foil even where the coating had been deformed.

Example XIV

In another attempt to provide a formulation adaptable to roller coating, a polytetrafluoroethylene dispersion (Teflon (R) 30-B by Du Pont) was diluted to a 45% by weight solids content. When this was roller coated onto an aluminum foil and dried, ants could not climb on the surface when it was skewed. The formulation had good adhesion to the aluminum foil but it could readily be washed away when, for example, it was placed under running tap water. To improve the adhesion of the coating and prevent it from being washed away, a small amount of Rohm & Haas HG-54d adhesion promotor was included in the formulation with good results.

It was also noted that the polytetrafluoroethylene particles were quite soft and when areas of the coated aluminum foil were pressed between the fingers, the polytetrafluoroethylene particles were smeared together and the film was no longer effective at those areas to prevent ants from climbing. However, when a 50% by weight of a titanium dioxide dispersion of circa 0.1 micron particle size (Du Pont R-742) was mixed with the polytetrafluoroethylene dispersion, the coating was resistant to compressive forces.

It is believed that the hardness of the titanium dioxide particles protected the polytetrafluoroethylene particles from smearing together. This mixture of solids not only produced an improved product that could be pressed in place and remain effective, but it also created a product that was easier to coat on aluminum foil.

The polytetrafluoroethylene dispersion contained about 8% of an nonionic surfactant sold by Union Carbide under its trade designation Triton (R) X-100. This caused two problems. First the surfactant caused the formulation to foam and resulted in irregularities in a film roller coated onto aluminum foil. Second, to prevent the film from rewetting, it was necessary to drive off the surfactant at a temperature of about 200 degrees Celsius for two minutes.

To avoid the above problems, the amount of surfactant was greatly reduced and a dispersing agent (Tamol-165) used in its place. This formulation containing both surfactant and dispersing agent roller coated very well without foaming and allowed the coated aluminum foil to be processed at about 120 degrees Celsius for only one minute. The result was a continuous film that would not rewet and which was effective to prevent insects from climbing over a coated surface when skewed.

A preferred formulation making use of the forgoing observations was prepared by mixing the following together:

a. 54% by weight of a polytetrafluoroethylene dispersion containing 45% solids and including:
   i. 2.5% by weight (based upon weight of polytetrafluoroethylene in the dispersion) of a nonionic surfactant (Triton (R) X-100),
   ii. 8% by weight (based upon weight of polytetrafluoroethylene in the dispersion) of a dispersing agent (Tamol-165), b. 44% by weight titanium dioxide dispersion (Du Pont R-742) containing 76% solids; and c. 2% by weight of an adhesion promotor (Rohm & Haas HG-54D).

The above formulation was successfully roller coated onto an aluminum foil which was dried for one minute at 120 degrees Celsius. The coating was continuous and free from bubbles; it was adhered sufficiently to the foil so that it could not be rubbed off, although some of the coating could be "lifted off" by an adhesive tape; it could not be rewet; and it was effective to prevent ants from climbing up its surface when skewed.

Example XV

To determine the effect of the size of the particles in preventing ants from climbing skewed surfaces, dispersion were prepared using polystyrene spheres.

| Particle Diameter Microns | Effectiveness Against Fire Ants |
| --- | --- |
| 0.09 | Excellent |
| 0.22 | Excellent |
| 0.62 | Poor |
| 2.0 | Poor |
| 6.4 | Very Poor |
| 12.0 | Failed |

The above table was developed using fire ants as the test insects. While the polystyrene spheres were not very effective at diameters over 0.6 microns, it should be noted that spheres of this size could have utility with insects larger than fire ants.

Examples XVI

To demonstrate that various shades other than those approaching spherical are also useful in the practice of this invention, films were prepared and tested with fire ants as tabularized below:

| Material | Shape | Size (microns) | Effectiveness |
| --- | --- | --- | --- |
| Clay | Plate | <1 | Excellent |
| Quinaridone | Cube | 0.2 | Good |
| Graphite | Plate | <1 | Very Good |
| Titanium Dioxide | Round | 0.1 | Excellent |
| PTFE | Rod | <0.5 | Excellent |

Example XVII

Several films were coated over substrates in accordance with this invention and the substrates were laid in a horizontal position near a hill of ants. The ants were allowed to walk back and forth freely over the surface for an extended period of time and then the coated substrate was removed and replaced with a skewed, uncoated glass plate. The ants that had crawled over the coated plate were immediately able to climb the glass plate without difficulty, This experiment clearly demonstrates the differences between the instant invention and the coatings disclosed and claimed in U.S. Pat. No. 4,263,740, to which reference has previously been made. The patent teaches that insects can climb on polished surfaces, such as glass, because of "a sticky pad or pulvilli" which enables the insect to adhere to smooth surfaces. The method of the patent makes use of this fact by causing the insect to crawl over a surface of loosely held particles which adhere to the pulvilli and destroy their ability to adhere to the smooth surface.

Because the coatings of this invention have no observable effect on the ability of an insect to crawl on a smooth surface, it can be concluded that the instant coatings are sufficiently adhered to the substrate so that they are not dislodged by the insect and do not adhere to the pulvilli of the insect. Stated differently, the coatings of the patent, in distinction to this invention, have essentially no adhesion to their substrate.

The foregoing observations are consistent with the fact that when the preferred coatings of the patent, that is dispersions of polytetrafluoroethylene particles in the size range of from 300 to 500 microns, are used to coat a substrate, the coatings can readily be removed, as by gentle brushing or by placing the coatings under running tap water. Thus it can be seen that the patent utilizes a coating which is very poorly adhered to a substrate and can he removed by adhering to an insect whereas the instant invention makes use of coatings that are sufficiently adhered to remain intact and are not capable of being removed when an insect attempts to crawl or climb upon them. coating.

The films of this invention have also been found useful in preventing insects, such as wasps, from building nests. When the dispersions are sprayed onto a surface, it apparently becomes difficult for the insects to attach their nests to the surface. In a like manner, spiders are unable to secure their fibers to the treated surfaces and so are unable to spin webs from these surfaces. It is within the scope of this invention to use the above described methods and means to prevent wasps and similar insects from building nests and to keep spiders from spinning webs in locations where they are not wanted.

Several different methods were discussed above to describe how to adhere a film of this invention to a substrate. One technique which has utility is to apply a base coat over the substrate and then spray the dispersion over the base coat. The base coat may be a sealant used to cover porous or rough surfaces. This technique is useful if the surface to be coated with a film is porous like wood, cement or brick and sealants like paint, shellac, cinder block sealants, epoxies and macadam sealants may prove suitable in different applications.

Another type of base coat which usefully may be applied to prepare a substrate to receive a film better is a solvent based contact cement. While as mentioned above the films of this invention lose their effectiveness in controlling insects if they are too tightly adhered to a surface, contact cements seem to adhere the films in a useful manner. It is believed that one of the reasons that contact cements work well is that most of them have a permanent tack (pressure sensitive) and do not dry to a hardened layer as do ordinary pastes and glues.

It is generally difficult to adhere the films of this invention to smooth or glossy surfaces such as acrylic or aluminum foil. However, by applying a base coat of a contact cement to these smooth surfaces before spraying them with a dispersion, good adhesion can be obtained, surprisingly without inhibiting the insect controlling properties of the film applied over the contact cement.

Adhesion promoting compositions are available in the marketplace that may be added directly to the dispersions of this invention. Improved adhesion of PTFE dispersions can be obtain using Tyzor (R) as discussed above but even better results have been obtained using polymeric acrylic binders such as Rohm & Haas acrylic binder HG 54D and Rohm & Haas acrylic binder WL-51. Both of these adhesion promoting compositions are water borne dispersions of about 41%–42% acrylic by weight and the balance essentially water. Their adhesion promoting characteristics are best utilized when the acrylic binders are added in an amount of from about 1% to about 10% by weight of the PTFE dispersion.

Not only do the acrylic binders improve the adhesion of a dispersion to a substrate, but they also reduce the tendency of the dried coatings to mud crack. It has been found, for example, that when several layers of a dispersion are coated on a substrate, it is common, as noted above, for cracks to form. However, when the acrylic binders are mixed with the dispersion, as many as ten successive layers have been applied to a substrate without appreciable mud cracking.

A number of other techniques may be used to promote adhesion between the dispersion coating and the substrate. These include such processes as exposing the substrate to a corona discharge, mechanically abrading or chemically etching the surface of the substrate and using primers that are applied directly to the substrate.

Several different methods may be used to spray the dispersions of this invention onto a surface as for example, using a hand pump. Spray aerosols contained in a pressurized are also convenient but care must be taken in selecting the propellant that is used. It has been found that many of the common propellants, such as most of the Freons(R), with the notable exception of Dymel (R), apparently react with some dispersions and can destroy the dispersion or cause the coating to foam when it is sprayed. One propellant which has been found compatible with PTFE dispersions is nitrogen.

Spray devices are now available which separate a gas under pressure from the liquid to be sprayed by means of a flexible, elastic membrane. These devices are advantageous in the practice of this invention since the propellant gas under pressure is isolated from the dispersion and thus there is no problem with the selection of a propellant.

It is sometimes useful to include coloring materials, such as pigments and dyes, in the dispersions of this invention so that the applied films are more readily visible. The films of this invention can be almost water clear, especially when they are applied in less than 1 mil thicknesses and from dispersions having low solids concentration. It is not always easy to determine if a continuous film of this kind has been formed and the inclusion of a colorant will allow one to see where he has sprayed and so avoid spraying the same spot more than once and building up a thicker film thickness that is desired.

I claim:

1. In a method for restricting the movement of insects on a skewed surface comprising the steps of:

forming a dispersion of finely divided particles having an average size of less than 5 microns with a suspending liquid and a surfactant;

applying the dispersion to the surface as a wet, continuous, thin coating of substantially uniform thickness; and evaporating the liquid from the coating to form a continuous film that is free from cracks and discontinuities which film is adhered to the surface the improvement comprising:

adjusting the viscosity of said dispersion before applying the dispersion, said adjusting comprising adjusting to a viscosity of 30–35 seconds as measured by a #2 Zahn cup by the addition of ethylene glycol monobutyl ether.

2. A method according to claim 1 wherein the dispersion is sprayed using a propellant.

3. A method according to claim 2 wherein the propellant is compatible with the dispersion.

4. A method according to claim 3 wherein the propellant is nitrogen.

5. A method according to claim 1 wherein the particles are polytetrafluoroethylene.

6. A method according to claim 1 wherein the dispersion additionally contains a stabilizing agent to protect the dispersion from freeze/thaw cycles.

7. A method according to claim 6 wherein the stabilizing agent is selected from the group consisting of monohydric alcohols having less than five carbon atoms, polyhydric compounds and the amine analogs of said monohydric alcohols and said polyhydric compounds.

8. A method according to claim 7 wherein the stabilizing agent is ethyl alcohol.

9. A method according to claim 1 wherein the dispersion additional includes a dispersant.

10. A method according to claim 1 wherein the dispersion additionally contains an adhesion promoter.

11. A method according to claim 10 wherein the adhesion promoter is a styrene modified acrylic copolymer.

12. A method according to claim 1 wherein the viscosity of the dispersion is adjusted to provide a dry coating of between 0.25 and 1 mil.

13. A method according to claim 1 wherein the surface is coated with a contact adhesive before the dispersion is applied.

14. A method according to claim 1 wherein the surface is coated with a sealant before the dispersion is applied.

15. A method according to claim 1 wherein the average size of the particles is less than 1 micron.

16. A method according to claim 15 in which the average size of the particles is less than about 0.5 microns.

17. A method according to claim 16 where in the average particle size does not exceed about 0.2 microns.

18. A method according to claim 1 wherein the particles are selected from the group consisting of polymers or pigments.

19. A method according to claim 18 wherein the polymers are halogenated hydrocarbons.

20. A method according to claim 18 wherein the pigment is titanium dioxide.

21. A method according to claim 18 wherein the particles are a mixture of polymers and pigments.

22. A method according to claim 21 wherein the polymer is polytetrafluoroethylene and the pigment is titanium dioxide.

23. A method according to claim 1 wherein said finely divided particles are selected from the group consisting of aluminum silicate, talc, carbon black, nylon, acrylic and a fluorinated hydrocarbon.

* * * * *

UNITED STATES PATENT AND TRADEMARK OFFICE
CERTIFICATE OF CORRECTION

PATENT NO. : 5,561,941

DATED : October 8, 1996

INVENTOR(S) : Roger H. Long

It is certified that error appears in the above-indentified patent and that said Letters Patent is hereby corrected as shown below:

Col. 4, line 42: insert -- ( -- before "or" first occurrence

Col. 6, lines 6: insert -- is -- after "it"

Col. 9, line 28: delete "pro-coated" and insert -- pre-coated --

Col. 12, line 45: delete "aisle" and insert -- able --

Col. 16, line 16: delete "HG-54d" and insert -- 54D --

Col. 18, line 16: delete "can he" and insert -- can be --

Col. 18, line 20: delete "coating"

Col. 18, line 64: delete "obtain" and insert -- obtained --

UNITED STATES PATENT AND TRADEMARK OFFICE
CERTIFICATE OF CORRECTION

PATENT NO. : 5,561,941

DATED : October 8, 1996

INVENTOR(S) : Roger H. Long

Page 2 of 2

It is certified that error appears in the above-indentified patent and that said Letters Patent is hereby corrected as shown below:

Col. 19, line 23: a word appears to be missing after "pressurized" insert -- can --

Col. 19, line 47: delete "that" and insert -- than --

Signed and Sealed this

Twenty-ninth Day of April, 1997

Attest:

Attesting Officer

BRUCE LEHMAN

Commissioner of Patents and Trademarks